United States Patent [19]

Morcos

[11] 4,115,322
[45] Sep. 19, 1978

[54] METHOD FOR OBTAINING HIGH ACTIVITY ELECTROCATALYSTS ON PYROLYTIC GRAPHITE

[75] Inventor: Ikram Morcos, Longueuil, Canada
[73] Assignee: Hydro-Quebec, Montreal, Canada
[21] Appl. No.: 804,729
[22] Filed: Jun. 8, 1977

Related U.S. Application Data

[63] Continuation-in-part of Ser. No. 646,994, Jan. 7, 1976, abandoned.

[51] Int. Cl.$^2$ .................. B01J 21/18; B01J 23/40; B01J 23/50; B01J 23/52
[52] U.S. Cl. .................................................. 252/447
[58] Field of Search ................... 252/447, 425.3; 204/43 R, 43 N, 43 T, 46 G, 47

[56] References Cited

U.S. PATENT DOCUMENTS

| | | | |
|---|---|---|---|
| 850,944 | 4/1907 | Marshall | 204/43 R |
| 2,178,454 | 10/1939 | Metzger et al. | 260/348 |
| 2,452,308 | 10/1948 | Lambros | 204/43 N |
| 3,077,508 | 2/1963 | Oswin | 252/447 X |
| 3,296,102 | 1/1967 | Worsham | 204/47 |
| 3,341,936 | 9/1967 | Sanstede et al. | 427/115 X |
| 3,440,181 | 4/1969 | Olstowski | 252/503 |
| 3,645,860 | 2/1972 | Fishman et al. | 204/46 G |

Primary Examiner—W. J. Shine
Attorney, Agent, or Firm—Bacon & Thomas

[57] ABSTRACT

A process for obtaining electrocatalysts having a thin film of a noble metal such as palladium, platinum, gold or less noble such as silver or an alloy of noble metals or a noble metal together with a less noble one such as silver or nickel. These include metals from Group VIII of the periodic chart. The thin film is electrodeposited on nonporous pyrolytic graphite surface from an aqueous solution containing a salt of the noble metal or metals in the presence of a complexing agent. The solution is stirred mechanically or the pyrolytic graphite cathode is rotated to create conditions favorable for the electrochemical deposition to be carried out at the highest possible current densities. The electrochemical catalysts thereby obtained are useful in oxygen adsorption processes, oxygen and hydrogen evolution processes, oxide formation and oxygen reduction processes. The metal or alloy film is of a granular or nodular nature and of a depth not exceeding 7$\mu$ and has a grain size smaller than 2$\mu$ or of a filament nature with peaks each of a base size running from 0.1 to 0.2$\mu$. The metal or the alloy is selected from the group comprising silver, palladium, gold, a gold-silver alloy and a silver-nickel alloy.

14 Claims, 13 Drawing Figures

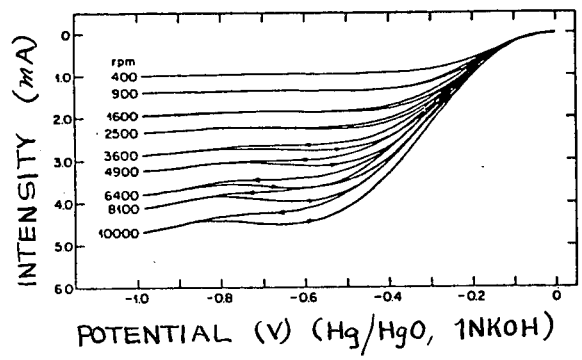
FIG. 6
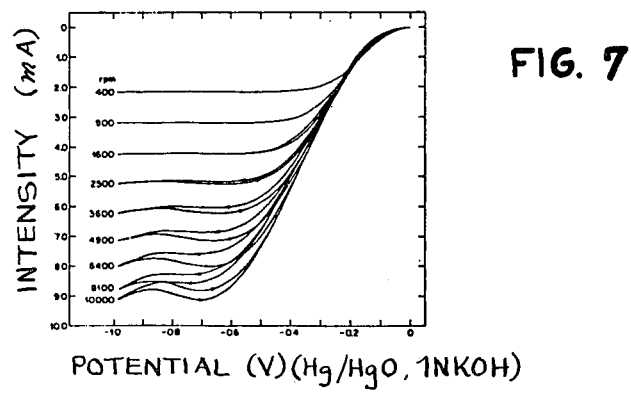
FIG. 7
FIG. 8
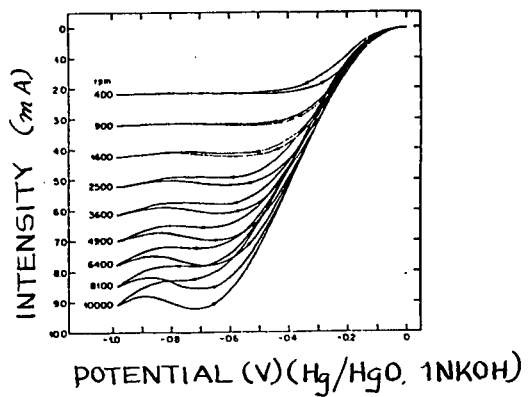

METHOD FOR OBTAINING HIGH ACTIVITY ELECTROCATALYSTS ON PYROLYTIC GRAPHITE

CROSS REFERENCE TO RELATED APPLICATIONS

This application is a continuation-in-part of Applicant's copending application Ser. No. 646,994, filed Feb. 7, 1976, now abandoned.

The present invention generally concerns processes for electrolytically depositing a noble metal, an alloy of one or more noble metals onto a graphite substrate or onto a foreign substrate, and the product thereby obtained.

More particularly, the present invention relates to a new process for obtaining electrochemical catalysers of the type constituted of a thin film of a noble metal or an alloy of one or more noble metals or of a noble metal combined with another metal deposited onto a graphite support or onto a foreign substrate.

The present invention also concerns electrochemical catalysers thereby obtained and which generally show outstanding electrocatalytic activity when used in cells and in batteries, and which show a particularly high electrocatalytic activity for the reduction of oxygen contained in aqueous solutions.

In view of the increase utilization of fuel cells in the actual technology, the present invention is of a particular interest in promoting the electrocatalytic reduction of oxygen.

Metals such as silver, platinum, rhodium, irradium or palladium are known to possess catalyst properties for effectively causing the electrochemical reduction of oxygen and have hitherto been often used as basic elements in the manufacture of oxygen electrodes for fuel cells.

In such applications, attempts have been made to decrease to a miniumum the quantity of catalytic metal necessary for producing electrodes so as to reduce their high cost price. Thus, U.S. Pat. No. 3,341,936 delivered on Sept. 19, 1967 proposes the use of oxygen electrodes made of a porous graphite core serving to support a catalytic metal. The method generally consists in impregnating pores of a highly porous graphite core with a solution containing a simple salt of a noble metal, such as silver chlorate, silver nitrate or palladium nitrate, mixed to a simple salt of another metal. Thermal or electrochemical reduction of the salt solution impregnating the core is then effected so as to cause deposition of the noble metal and the other metal into the pores of the core. Thereafter, the other metal is dissolved to finally obtain the desired electrode. The main advantage of this process is in the increasing to a maximum of the active surface of the catalyst while utilizing as less quantity of noble metals as possible. Although at low-cost price, the catalyst thereby produced failed to offer an improved catalytic activity in terms of increased catalytic activity per active surface unit.

A process has been found for obtaining electrochemical catalysts through mere electrolytic deposition. The catalysts thereby obtained are made of a thin film of a noble metal or an alloy of noble metals or of a noble metal together with another metal selected from group VIII of the periodic chart deposited onto a graphite support these catalysts being characterized in a particularly high electrocatalytic activity for reducing oxygen contained in aqueous solutions.

Thus, the electrocatalytic activity of the catalysts used to reduce oxygen and which are constituted of a noble metal or an alloy of noble metals or of a noble metal together with another metal selected from group VIII of the periodic chart when deposited on a graphite support or a foreign substrate, has been found to rely more upon the reversability of oxygen surface retention property of the metal during the reduction reaction than upon an increase of the true surface of the catalyst. In other words, the electrocatalytic activity of a catalyst has been found more closely related to the granular, modular or filament structure of the deposited metallic film than the surface area of this film.

In accordance with the present invention, there are obtained electrochemical catalysts which are actually characterized in such granular, modular or filament surface structure and hence of a high electrocatalytic activity. Such structure is realized by electrodepositing a noble metal or an alloy of noble metals or of a noble metal with another metal selected from group VIII of the periodic chart onto the graphite support or the foreign substrate, starting from an aqueous solution of salt containing such noble metal or metals in contact with a complexing medium.

According to a first embodiment of the present invention the noble metal comprises silver and the electrolytic deposition is preferably effected with cyanide ions. Such a silver deposition may be affected, for example, from an aqueous solution of silver nitrate, sodium cyanide and sodium bicarbonate subjected to an electric current ranging from 1 to 12 mA for a time interval of about 3 to 12 minutes.

In accordance with another embodiment of the present invention, the noble metal comprises palladium and the electrolytic deposition is preferably effected with chloride ions. The palladium is deposited when starting with an aqueous solution of palladium chloride, ammonium chloride and chloridric acid.

Of course, there may be used other noble metals, such as gold or alloys of noble metals, such as for example a gold-silver alloy or alloys made of a noble metal and another metal selected from group VIII of the periodic chart, such as for example a silver-nickel alloy.

In any case, whichever noble metal or alloy is selected a support of a pyrolytic graphite or a platinum substrate will be utilized.

It is known that the electrolytic deposit of a metal onto a graphite support or a foreign substrate with which no mixed crystals are formed, leads to the production of a new phase requiring a certain energy, called nucleation energy, corresponding to a certain overpotential so-called nucleation overpotential.

It is also known that the adhesion property of a metal film onto the graphite support or the foreign substrate may be in function of the magnitude of that nucleation overpotential. Microcrystal deposit conditions promote the formation of grains or filaments onto the graphite support or the foreign substrate and enhance the adhesion characteristics. The higher the nucleation overpotential is, the stronger will be the adhesion between the deposited metal and the graphite support or the foreign substrate.

Such correlations between nucleation overpotential, adhesion and grain or filament size explain the all-importance consequence of adding a complexing agent into the solution from which electrolysis is effected, which is in accordance with the present invention.

For example, the high stability constant ($5.6 \times 10^{18}$) of silver cyanide results in a quite low concentration of silver ions. Consequently, a nucleation overpotential of high magnitude is required to break the strong bonding forces and bring the ionic concentration into the required super saturation value to form the metal-graphite bondings.

The process in accordance with the present invention allows the obtaining of electrochemical catalysts having a new microcrystalline surface structure, outstanding adhesion properties as well as improved electrocatalytic properties in reducing oxygen resulting from a better adhesion reversability of the oxygen.

In conrast with catalysts made of bulk metals, the catalysts of the present invention are not only of a low cost price but are also more reliable, whereas the electrolytic deposition process to carry them out offers a better reproductability control, particularly regarding the surface, the grain size and the impurities while allowing more current kinetic measurements.

It is of interest to observe that, with the process in accordance with the present invention, highly porous graphite or foreign substrate need not be used. Thus, substantially pure pyrolytic graphite, that is, non-porous graphite obtained from hydrocarbon pyrolysis under high pressure, or a foreign substrate having a smooth surface, such as platinum substrate, may be alternatively used.

It is advantageous to use a non-porous electrode for the following reasons.

1. A non-porous electrode does not suffer from the problem of electrolyte penetration into the pores which cause the disintegration and eventual destruction of the substrate particularly if the latter is made of graphite (see FUEL CELLS, Editor W. Mitchell, Jr., Academic Press, New York 1963, p. 407 to 413).

2. A far simpler and less time consuming effort is needed to produce a catalyst at the surface of a non-porous substrate than to produce the same inside the pores.

3. The problems of mass transfer inside the pores of porous substrate drastically limit and in most cases eliminate the use of the electrochemical methods for producing the catalyst. Such problems can be easily controlled if the substrate is non-porous.

4. Non-porous substrates generally have much better mechanical properties than porous substrates made of the same material. Better mechanical properties increase the lifetime of the electrode and permit more flexible use.

It is an object of the present invention to provide a useful producing non-porous catalytically active electrodes which contain only a small amount of catalytically active metal or alloy and are characterized by a catalytic activity that is greater than that of the metal or alloy in the massive form.

This object is achieved by a method of producing an electrochemical catalyst consisting of a thin film of a metal selected in the group consisting of Ag, Ni, noble metals and alloys thereof, which methods consist in electrolycally depositing said thin film onto a non-porous pyrolytic graphite support in a simple electrochemical cell from an aqueous solution containing said Ag, Ni, noble metals or alloys thereof in a complex salt form.

The non-porous substrate used in the present invention is a type of graphite widely known as pyrolytic graphite. This type of graphite has been fully disclosed in the literature. In this connection, reference can be made to A. W. Moore, "Pyrolytic Graphite", Ned T. Natuurk, July 32, 1966 and to A. R. Gardner, "Beat the heat with pyrolytic graphite", prod. Eng. 33, no. 2, 72–5 (1962). All of these references testify to the non-porous nature of the pyrolytic graphite and describe its permeability and density properties. These references also give information on its mechanical properties and electrical resistivity that is relevant to the present application.

The pyrolytic graphite which is preferably used in accordance with the present invention is a product of Union Carbide Corporation, grade HPG with a high bulk density of 2.18 g/cc. This density is considerably higher than that of conventional or commercial polycrystalline graphite which has a bulk density between 1.4 and 1.9 g/cc. This high density of pyrolytic graphite gives the material unusual resistance to penetration by gases. According to Moore, the permeability of pyrolytic graphite at 300° K is less than $10^{-9}$ cm$^2$/sec. In comparison, the permeability of conventional polycrystalline graphite at 300° 1 K is 0.1–10 cm$^2$/sec. According to Gardner, helium at pressures below $1 \times 10^{-6}$ mm Hg does not penetrate pyrolytic graphite even in thin films (1 to 2 mils) after thermal cycling to above 4000 F. Gardner also states that pyrolytic graphite is virtually free of pores (A. R. Gardner, Prod. Eng. 33, no. 2, 1962, p. 75). It should be remembered that the high density, resistance towards gas permeability and absence of pores are properties that are closely related to each other.

Pyrolytic graphite has superb mechanical properties. Its compressive strength, tensile strength and strength/density ratio are far greater than those characterizing commercial porous graphite.

Pyrolytic graphite has also a higher oxidation resistance as compared to porous or commercial porous graphite.

It is, therefore, readily apparent that the electrodes according to the invention in which pyrolytic graphite is used as substrate have much more durability and have much more resistance and stability towards oxidation and corrosive conditions. These are very desirable characteristics for electrocatalysts.

The method of producing catalyst in accordance to the present invention takes full advantage of the unique combination of the non-porosity, conductance and structural nature which characterizes the pyrolytic graphite. The metal or alloy catalyst layer is produced on the pyrolytic graphite surface by a one step electrochemical deposition process. Since the graphite is non-porous the electrochemical deposition is carried out in a simple cell in which the electrolyte is mechanically stirred to overcome the problem of mass transfer and sustain high striking current densities and high current densities of deposition. Mechanical stirring by a magnetic stirrer is in some cases insufficient to produce the desired forced convection and the graphite electrode should be used during the deposition as a rotating disc electrode. High current densities are necessary to provide a sufficient adhesion and a high electrocatalytic activity. The adhesion between the electrodeposited metal or alloy and pyrolytic graphite surface are also greatly enhanced in accordance with the invention by electrodepositing the metal or alloy from a solution containing a complex agent.

The fact that it is possible to control the rate of the electrochemical deposition by controlling the striking current densities and current densities of deposition is an important advantage of the electrochemical method according to the invention.

Because of its structural nature, pyrolytic graphite does not form mixed crystals with metals and consequently it does not exhibit an orienting effect on the electrodeposited metal structure. Highly disoriented and nonequilibrium metal structure which are characteristics of electrodeposits obtained at high current densities are consequently frozen as such on the graphite substrate. Such electrodeposited surface have high surface energies which in turn reduce the activation energy in electrocatalytic reactions.

Another important parameter which can be conveniently controlled in the present method is the time of electrodeposition. For a deposition obtained at a certain current density it is desirable to use the shortest possible time necessary to obtain a well adhering metal or alloy layer.

These and other features of the present invention will become more apparent from the following non restrictive examples and the accompanying drawings wherein:

FIG. 6 shows the oxygen reduction current-potential curve obtained with an electrochemical catalyst made of a silver film electrolytically deposited on pyrolytic graphite, at different rotation rates ($O_2$ — saturated 0.1 N KOH, temperature at 25° C, −1 V at a rate of 1 V/minute;

FIG. 7 shows the oxygen reduction current-potential curve obtained with an electochemical catalyst of bulk silver, at different rotation rates ($O_2$ saturated 0.1 N KOH solution, temperature at 25° C, electrode area: 0.786 $cm^2$ potential scanned from 0 to −1 V, at a rate of 1 V/minute;

FIG. 8 shows the oxygen reduction current-potential curve obtained with an electrochemical catalyst made of a silver film electrolytically deposited on bulk silver, at different rotation rates ($O_2$ saturated 0.1 K NOH, electrode area of 0.786 $cm^2$ potential scanned from 0 to −1 V at a rate of 1 V/minute, at a temperature of 25° C);

Figure 9:
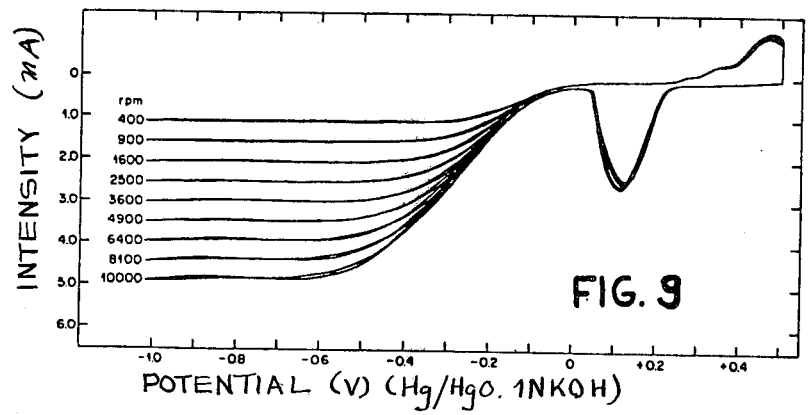
Figure 10:
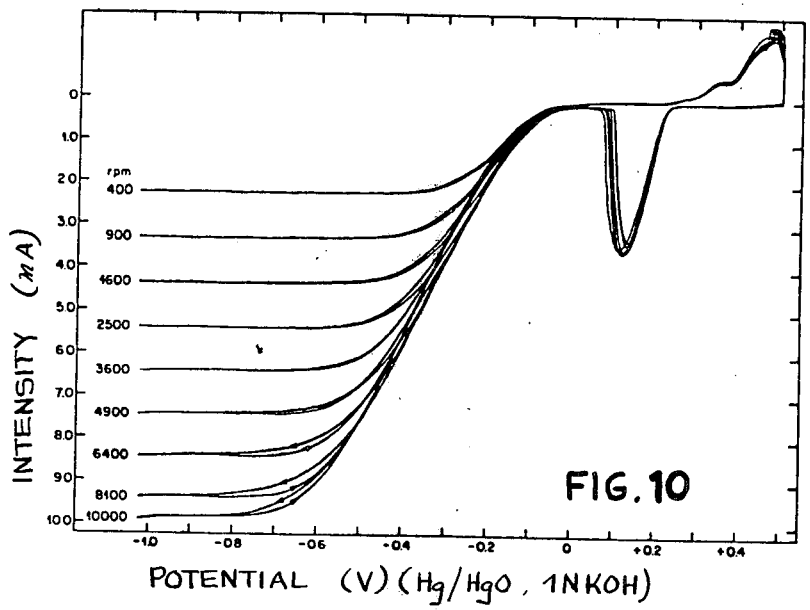
Figure 11:
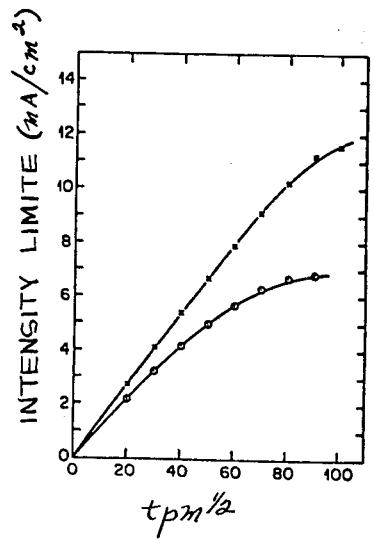
Figure 13:
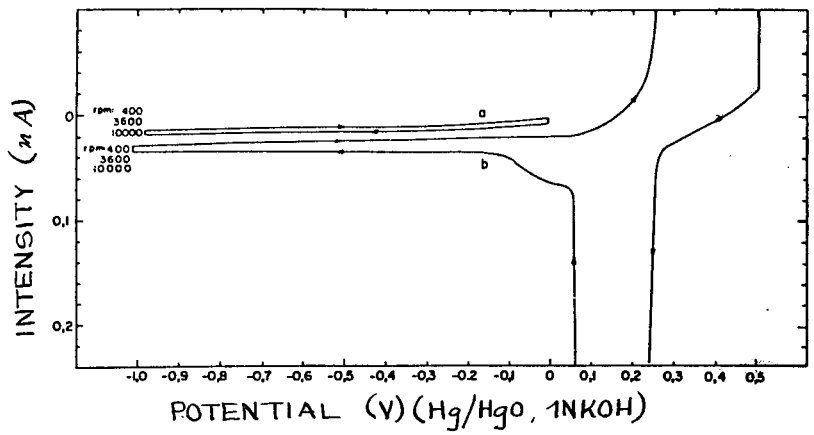
Figure 12:
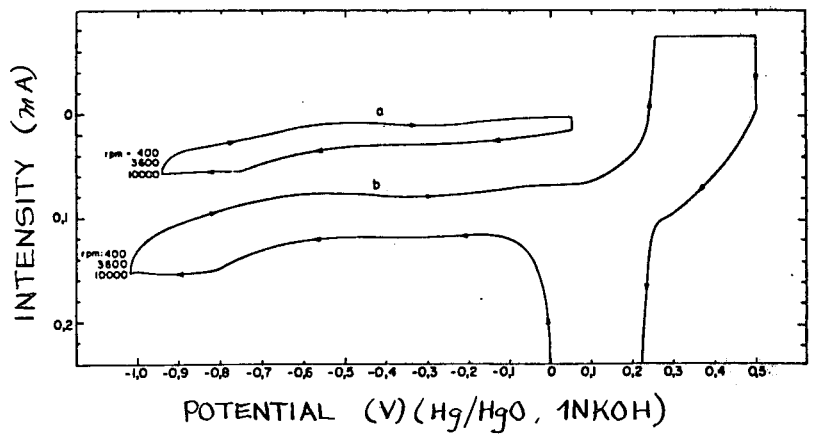

FIG. 9 shows current-potential curves for reduction of $O_2$ on electrodeposited silver on pyrolytic graphite at different rotation rates in $O_2$-saturated 0.1 N KOH. Temperature 25° C, electrode area 0.338 $cm^2$ and potential scanned from 0.5 to 1 V at a rate of 1 V/minute;

FIG. 10 shows current-potential curves for reduction of $O_2$ on bulk silver electrode at different rotation rates in $O_2$ — saturated 0.1 N KOH. Temperature 25° C, electrode area 0.786 $cm^2$ and potential scanned from 0.5 to −1 V at a rate of 1 V/minute;

FIG. 11 shows the effect of pretreatment in dilute $HNO_3$ on the dependence of the limiting current/$cm^2$ on the square root of rotation for:

X a film of silver deposited on pyrolytic graphite
o a massive silver electrode;

FIG. 12 shows current-potential plots on silver electrodeposited on pyrolytic graphite at different rotation rates in He-saturated 0.1 N KOH. Temperature 25° C, electrode area 0.338 $cm^2$, and potential scan; curve a, from 0 to −1 V, and curve b, from 0.5 to −1 V at a rate of 1 V/minute; and FIG. 13 shows current-potential plots on bulk silver electrode at different rotation rates in He-saturated 0.1 N SOH. Temperature 25° C, electrode area 0.786 $cm^2$, and potential scan: curve a, from 0 to −1 V, and curve b, from 0.5 to 1 V at a rate of 1 V/minute.

The following non limiting examples of the present invenion are given.

EXAMPLE 1

A conventional electrochemical cell was used to effect electrolytic deposition of a silver film onto cathodes made of pyrolytic graphite.

The electrolytic deposit was effected at ambient temperature with a solution of 16.25 mg of slver nitrate, 12.5 mg of cyanide and 13.75 mg of sodium bicarbonate in 500 ml of water. A silver thread was used as anode to prevent the solution from being contaminated.

The following results were obtained:

| current intensity (C.C.) | electrolysis time | thickness of silver film on pyrolytic graphite |
| --- | --- | --- |
| 1 mA/$cm^2$ | 8 minutes | 1 - 2 μ |
| 1 mA/$cm^2$ | 12 minutes | 3 - 4 μ |
| 3 mA/$cm^2$ | 12 minutes | 6 - 7 μ |

An analysis of the catalyst surface thereby obtained was carried out by a scanning electron microscope to show that the silver film surface was of a granular deposition with grain size less than 2 μ.

Those electrochemical catalysts are characterized by a high electrocatalytic activity for the reduction of oxygen, as will be explained in detail thereon.

EXAMPLE 2

Electrolytic deposition of a silver film was effected while utilizing a platinum substrate as the cathode, under the same experimental conditions as in Example 1.

An analysis of the surface of the catalyst thereby obtained carried out with a scanning electron microscope showed that the surface of the deposited silver film is again granular.

That electrochemical catalyt is also characterized by a high electrocatalytic activity in the reduction of oxygen.

EXAMPLE 3 (comparative)

Silver film electrolytic deposits were effected under the same experimetal conditions as in Example 1 while utilizing a silver substrate as the cathode.

A grain size analysis of the silver film deposited on the silver substrate was made and, in this case, a crystallization phenomenon was observed. The size of the crystal obtained is much greater than that of the grains forming the silver film when using a pyrolytic graphite support.

The electrochemical catalysts made up of a silver film electrolytically deposited on a silver substrate were found to have a lower electrocatalytic activity for the reduction of oxygen than that of catalysts obtained by the process described in examples 1 and 2.

As mentioned previously, it seems that the difference in grain size causes a difference in electrocatalytic activity and affects the reproductibility of the results obtained with silver films deposited on various types of supports or substrates.

EXAMPLE 4

Using an electrochemical cell of the conventional type, the electrolytic deposition of a palladium film onto a pyrolytic grahite cathode was effected.

The deposit was carried out at a temperature of 50° C with a solution of 17.6 mg of palladium chloride, 15 mg of ammonium chloride and 25 ml of hydrochloric acid in 500 ml of water.

The current intensity was 120 mA/cm$^2$ and the electrolysis time was of 25 seconds.

An analysis of the obtained catalyst surface with a scanning electron microscope showed that the paladium film deposited has a surface made up of filament-like peaks the base of which is between 0.1 to 0.2 $\mu$ in size.

That electrochemical catalyst has shown outstanding electrocatalytic activity to reduce oxygen, as we will see later on.

EXAMPLE 5 (Comparative)

The electrolytic deposition of a palladium film onto a palladium substrate was effected under the same experimental conditions as in Example 4.

The electrochemical catalyst thereby obtained has shown a much less efficient electrolytic activity for the reduction of oxygen than that of the catalyst of Example 4.

EXAMPLE 6

Using a standard electrochemical cell, the electrolytic deposition of gold film onto a pyrolytic graphite cathode was effected.

The deposition was carried out at ambient temperature with a solution of 6.8 g of $HAuCl_4.3H_2O$ and of 222 g of calcium chloride in 500 ml of water.

The current density was 6 mA/cm$^2$ and the electrolysis time was 20 minutes.

The electrochemical catalyst thereby obtained has shown improved electrocatalytic activity when compared with an equivalent catalyst of bulk gold metal.

EXAMPLE 7

Using a conventional electrochemical cell, the electrolytic deposition of a film made of an alloy of gold and silver onto a pyrolytic graphite cathode was effected.

The deposition was carried out at ambient temperature with a solution of 4.5 g of $KAu(CN)_2$, of 10.0 g of potassium cyanide and of 3.02 g of silver cyanide in 500 ml of water.

Two catalysts showing good electrocatalytic activity have been respectively prepared under the following conditions:

| current density (D.C.) | electrolysis time |
| --- | --- |
| 30 mA/cm$^2$ | 5 seconds |
| 6 mA/cm$^2$ | 12 minutes |

EXAMPLE 8

With an electrochemical cell of the conventional type, the electrolytic deposition of a film made of a silvernickel alloy was effected onto a pyrolytic graphite cathode.

The deposition was carried out at ambient temperature with a solution of 6.7 g of silver cyanide, 1.1 g of nickel cyanide and 12 g of sodium cyanide in 1,00 ml of water.

The catalyst thereby obtained has shown a high electrocatalytic activity and has the further advantage of being inexpensive, thereby allowing a general application to conventional cells or so-called air-metal batteries.

EXAMPLE 9

Using a simple conventional cell with two palladium anodes symmetrically placed around the pyrolytic graphite cathode palladium is electrodeposited from a mechanically stirred solution containing 17.6 g palladium chloride, 15 g ammonium chloride and 25 ml hydrochloric acid in 500 ml of distilled water. Different palladium electrodeposits are obtained using the following current densities and time of deposition: 5.1 mA/cm$^2$ and 35 min., 30 mA/cm$^2$ and 60 sec., 60 mA/cm$^2$ and 30 sec., 120 mA/cm$^2$ and 15 sec., 150 mA/cm$^2$ and 12 sec.

The electrodes thus prepared can be used as active catalyst for the electrochemical adsorption of oxygen-carrying species from various solutions. To demonstrate their extraordinary catalytic activity towards this particular application, the following examples are carried out. Each of the electrodes prepared as described above is made an anode in an electrochemical cell containing He-saturated 0.1 N $H_2SO_4$. The potential is adjusted at a certain anodic value for 10 sec. The potential is then cathodically swept at a rate of 20 mV/sec and the amount of adsorbed oxygen is determined by integrating the oxygen reduction peak of the voltammetry curve. The potential is then adjusted at value 0.2 V higher than the previously adjusted value and the same procedure is followed to obtain the amount of adsorbed oxygen corresponding to this new value. The experiment is repeated at several oxidizing potentials. The dependence of the quantity of absorbed oxygen on the oxidizing potential is plotted in FIG. 1 for different palladium deposits where plots $b, c, d, e$ and $f$ are for the deposits obtained at 5.1, 30, 60, 120, and 150 mA/cm$^2$ respectively. Plot $a$ shows the corresponding dependence obtained with the same procedure with a massive palladium electrode.

When palladium is electrodeposited on a massive palladium electrode using a current density of 120mA/cm$^2$ and 15 sec. time of deposition and the same procedure described above was followed to study oxygen adsorption, the dependence observed was very similar to that obtained with a massive palladium electrode.

Figure 1:
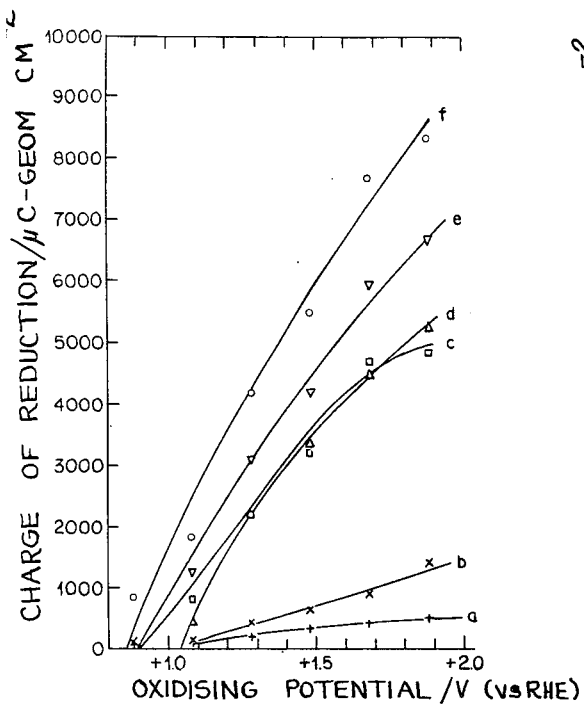
FIG. 1 shows the dependence of the quantity of adsorbed oxygen on the oxidizing potential for the electrochemical adsorption of oxygen on different film of palladium deposited on pyrolytic graphite.

The results plotted in FIG. 1 show that a palladium layer electrodeposited on a pyrolytic graphite substrate has an electrocatalytic activity toward oxygen adsorption which is significantly higher than that observed with a massive palladium electrode and that the said electrocatalytic activity increases with the increase in the current density of depositing the palladium.

EXAMPLE 10

Figure 2:
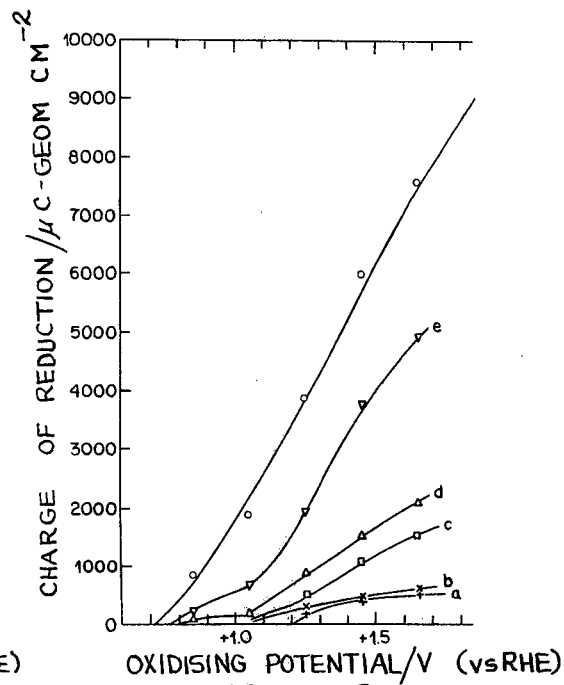
FIG. 2 shows in another scale the dependence of the quantity of adsorbed oxygen on the oxidizing potential for the electrochemical adsorption of oxygen on different films of palladium deposited on several pyrolytic graphite samples.

Palladium is electrodeposited as described in Example 9 on several pyrolytic graphite samples. Oxygen adsorption as a function of the oxydizing potential is determined as described in Example 9 on the thus prepared palladium electrodes in He-saturated 0.1 N KOH solution. The results are shown in FIG. 2 where plots $b$, $c$, $d$, $e$ and $f$ are for the palladium deposits obtained at 5.1, 30, 60, 120 and 150 mA/cm$^2$. Plot $a$ shows the corresponding relationship obtained for a massive palladium electrode.

The results of FIG. 2 show the extraordinary high electrocatalytic activity of Pd-on pyrolytic graphite electrode as compared to a massive palladium electrode.

EXAMPLE 11

Palladium was electrodeposited on pyrolytic graphite samples in the manner described in Example 9, using the following current densities and time of deposition: 5.1 mA/cm$^2$ and 35 minutes, 30 mA/cm$^2$ and 60 sec., 150 mA/cm$^2$ and 12 sec. The electrodes were used as anodes in a cell containing He-saturated 1N H$_2$SO$_4$ and the potential was slowly and potentiostatically scanned between 1.18 V (vs. NHE) and 2.08 V. The current-potential curve for oxygen evolution was traced on an X-Y recorder. The same test was also performed on a massive palladium electrode. Table I shows the potential corresponding to a current density of 10 mA/cm$^2$ of oxygen evolution observed on the potential current curves of the described experiments. In the case of Pd-on pyrolytic graphite electrodes the electrode is identified by the current density at which the electrodeposition of the palladium was carried out.

TABLE I

Potential of massive palladium and Pd-on pyrolytic graphite electrodes for oxygen evolution at a current density of 10 mA/cm$^2$.

| Type of Palladium | Potential vs. NHE corresponding to a current density of 10 mA/cm$^2$ |
|---|---|
| Massive Pd | 1.835 V |
| Pd electrodeposited on pyrolytic graphite with 5.1 mA/cm$^2$ and 35 minutes | 1.795 V |
| Pd electrodeposited on pyrolytic graphite with 30 mA/cm$^2$ and 60 seconds | 1.725 V |
| Pd electrodeposited on pyrolytic graphite with 120 mA/cm$^2$ and 15 seconds | 1.71 V |
| Pd electrodeposited on pyrolytic graphite with 150 mA/cm$^2$ and 12 seconds | 1.675 V |

Table I shows that a palladium surface electrodeposited from palladium chloride solution on pyrolytic graphite is more catalytically active for oxygen evolution than a massive palladium electrode. The higher the current density applied in the deposition of Pd, the higher the electrolytic activity toward oxygen evolution.

EXAMPLE 12

Palladium is electrodeposited on pyrolytic graphite samples in the same manner described in Example 9, using the following current densities and time of deposition: 5.1 mA/cm$^2$ and 35 min., 30 mA/cm$^2$ and 60 sec., 120 mA/cm$^2$ and 15 sec., and 150 mA/cm$^2$ and 12 sec. Each of these electrodes is used as a rotating disc cathode in an electrochemical cell containing oxygen-saturated 0.1 N KOH solution and the potential of the electrode is cathodically swept between 0.2 V and −0.5 V (vs. Hg/HgO, 1.0 N KOH). The experiment is carried out at different rotation rates. The same experiments are performed on a rotating disc electrode of a massive palladium electrode. The dependence of the limiting current density on the square root of rotation rate (Levich plots) for different Pd-on pyrolytic graphite electrodes are plotted in FIG. 3. The plots $b$, $c$, $d$ and $e$ are for palladium deposits obtained with 5.1, 30, 120 and 150 mA/cm$^2$ and plot a shows the corresponding relationship with a massive palladium electrode. The results show that a Pd-on pyrolytic graphite electrode can be prepared to have a significantly higher electrocatalytic activity toward oxygen reduction as composed to a massive palladium electrode.

Figure 3:
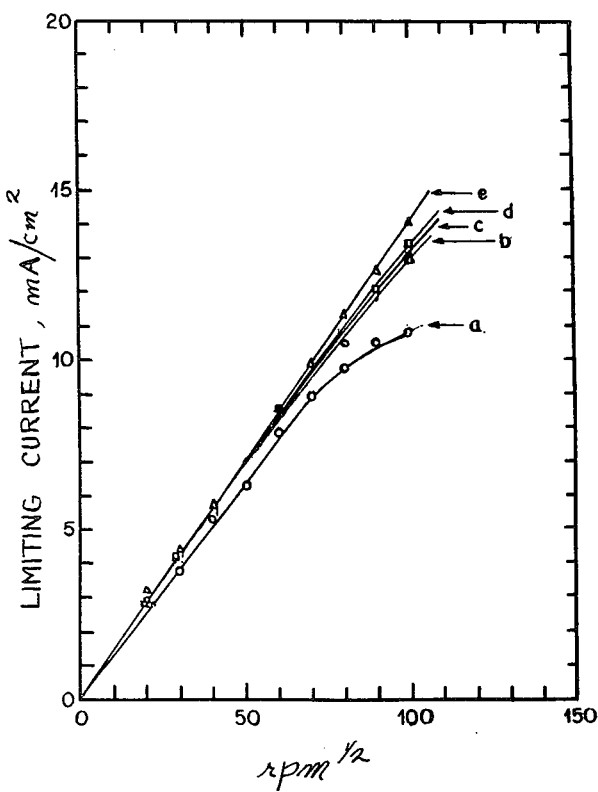
FIG. 3 shows the dependence of the limiting current density on the square root of rotation rate for different films of palladium deposited on pyrolytic graphite.

It is important to notice that plot e of FIG. 3 shows values of current densities which correspond to the values for a theoretical Levich plot for a 4-electron diffusion controlled O$_2$ reduction process. Such an electrode can then be used to determine the concentration of oxygen in an alkaline medium. Given a certain alkaline solution with an unknown concentration of oxygen, the latter can be determined from the experimentally measured limiting current density at a certain fixed rotation rate using the relationships $$i_d = 10^3 \left( \frac{2\pi}{60} \right)^{\frac{1}{2}} \cdot \frac{nFACv^{\frac{1}{2}}(0.621 S_c^{-\frac{1}{6}})}{1 + 0.298 S_c^{-\frac{1}{3}} + 0.145 S_c^{-\frac{2}{3}}} \cdot \sqrt{\omega}$$

where $i_2$ the mass transfer limiting current $\omega$ the rotation rate, $v$ the kinematic viscosity, D the diffusion coefficient of oxygen (moles/cm$^3$), $n$ the number of the disc electrode area (cm$^2$), C the bulk concentration of oxygen (moles/cm$^3$), SC=$v/D$ is the Schmidt number and $\omega$ is the rotation rate in rev/min. See J. Newman, J. Phys. Chem., 70 1327 (1966).

EXAMPLE 13

Figure 4:
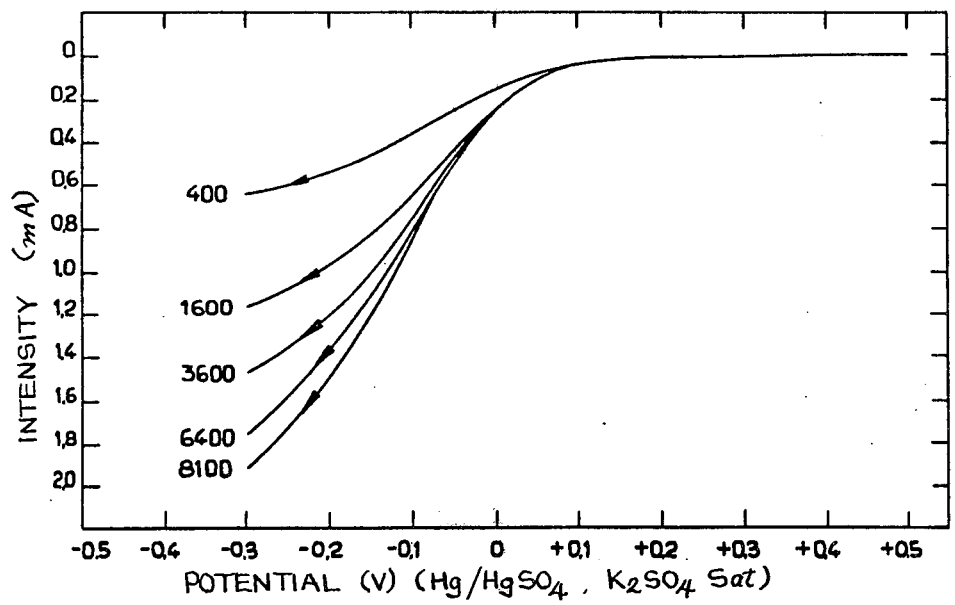
FIG. 4 shows current-potential curves for $O_2$ reduction on a palladium surface electrodeposited on pyrolytic graphite at different rotation speeds in $O_2$ — saturated 0.1 N $H_2SO_4$ solution Potential scanned at a rate of 0.025 V/minute in the cathodic direction. Electrode area is 0.338 $cm^2$.
Figure 5:
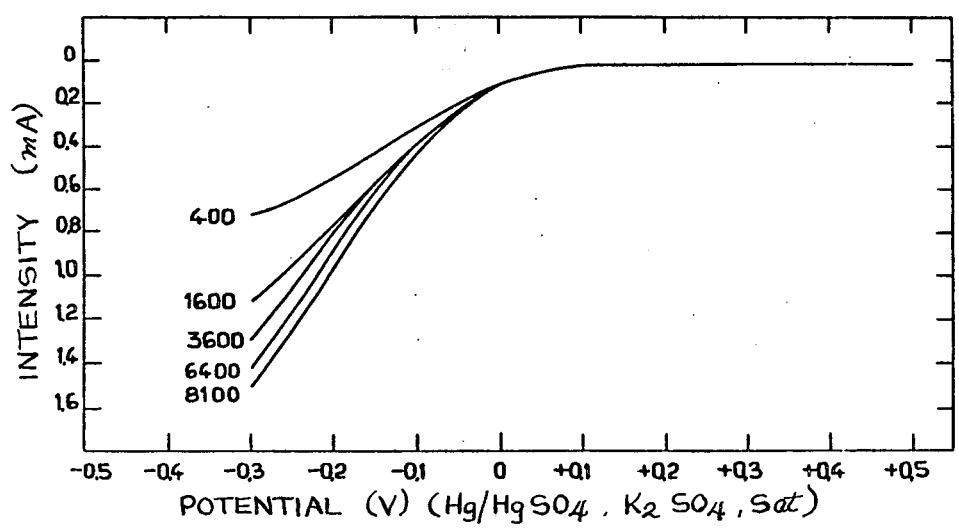
FIG. 5 shows current-potential curves for $O_2$ reduction on a mechanically polished bulk palladium electrode at different rotation speeds in $O_2$ — saturated 1.0 N $H_2SO_4$ solution Potential scanned at a rate of 0.025 V/minute in the cathodic direction. Electrode area is 0.478 $cm^2$.

Palladium is electrodeposited on a pyrolytic graphite sample in the same manner described in Example 9 at a current density of 118 mA/cm$^2$ and 25 sec. time of deposition. The electrode is used as a rotating disc electrode in an electrochemical cell containing oxygen-saturated 1N H$_2$SO$_4$. The potential is potentiostatically swept from 0.5 V to −0.3 V at the very slow scanning rate of 0.025 V/min. to assure the attainment of steady state. The current of oxygen reduction is recorded as a function of the applied potential on a X-Y recorder. The experiment is repeated at different rotation rates. The same experiments are performed on a massive palladium electrode used as a rotating disc electrode. The voltammetry curves obtained with different rotation rates with the Pd-on pyrolytic graphite electrode are shown on FIG. 4 and the corresponding curves obtained on the massive palladium electrode are shown on FIG. 5. Notice that the geometrical surface area of the Pd-on pyrolytic graphite electrode is 0.338 cm$^2$ and that of the massive palladium electrode is 0.478 cm$^2$. FIGS. 4 and 5 show that the Pd-on pyrolytic graphite electrodes have a considerably higher electrocatalytic activity toward oxygen reduction in acid solutions as compared to the massive palladium electrode.

EXAMPLE 14

Using a simple conventional cell with two platinum anodes symmetrically placed around a pyrolytic graphite electrode as a cathode, platinum is electrodeposited on pyrolytic graphite from a mechanically stirred solution of the following composition: 10 g $H_2PtCl_6$, 300 ml conc. HCl in 500 ml of water. The bath temperature is between 60 and 70° C. The deposition is carried out at a current density 24 mA/cm$^2$ for 10 min.

TABLE 2

Quantity of adsorbed oxygen per geometrical unit surface are at different oxidizing potentials for massive platinum and platinum electrodeposited on pyrolytic graphite.

| Oxidizing potential vs. NHE | Type of platinum | Quantity of adsorbed oxygen in $\mu c/cm^2$ |
| --- | --- | --- |
| 0.8 V | Massive platinum | 702 |
|  | Pt on pyrolytic graphite | 7174.5 |
| 1.0 V | Massive platinum | 220 |
|  | Pt on pyrolytic graphite | 13,239 |
| 1.2 V | Massive platinum | 435 |
|  | Pt on pyrolytic graphite | 18,713 |
| 1.4 V | Massive platinum | 718 |
|  | Pt on pyrolytic graphite | 22,559 |
| 1.6 V |  |  |

The amount of adsorbed oxygen on the electrodeposited platinum on pyrolytic graphite layer from a He-saturated 1.0 N $H_2SO_4$ solution was determined at different oxidizing potentials as described in Example 9. These values are compared in Table 2 with the corresponding values measured on massive platinum electrode. A Pt-on pyrolytic graphite electrode prepared as described above adsorb very significantly larger quantities of oxygen as compared to a massive platinum electrode.

EXAMPLE 15

Platinum is electrodeposited on a pyrolytic graphite sample, using the same procedure described in Example 14 at a current density of 24 mA/cm$^2$ and 10 min. time of deposition. The electrode is used as a cathode in an electrochemical cell containing $H_2$-saturated 1 N $H_2SO_4$ The potential is potentiostatically scanned from 0 V to −1 V (vs. NHE) and then in the reverse direction from −1 V to 0 V (vs. NHE). In both potential scans the current of hydrogen evolution is recorded against the potential on an X-Y recorder. The same experiment is performed with a massive platinum electrode. Some current-potential data obtained from the recorded curves of both experiments are given in Table 3. The results show that a Pt-on pyrolytic graphite surface has a considerably higher electrocatalytic activity toward hydrogen evolution per unit geometrical surface area as well as high reversibility as compared to the corresponding electrocatalytic activity of a massive platinum electrode.

TABLE 3

Current density at different potentials for hydrogen evolution for both cathodically and anodically swept potentials on massive platinum and platinum electrodeposited on pyrolytic graphite at a current density of 24 mA/cm$^2$ and 10 minutes time of deposition.

| Potential vs. NHE | Type of platinum | Current density in mA/cm$^2$ for cathodically swept potential | Current density in mA/cm$^2$ for anodically swept potential |
| --- | --- | --- | --- |
| −0.22 | Massive platinum | 47.81 | 17.92 |
|  | Pt on pyrolytic graphite | 106.5 | 94.6 |
| −0.44 | Massive platinum | 67.7 | 35.8 |
|  | Pt on pyrolytic graphite | 215.9 | 198.2 |
| −0.64 | Massive platinum | 83.6 | 47.8 |
|  | Pt on pyrolytic graphite | 316.5 | 316.5 |

EXAMPLE 16

Using a simple conventional electrochemical cell with two silver anodes placed symmetrically around a pyrolytic graphite cathode, silver is electrodeposited from a solution which has the following chemical composition: 16.25 g silver nitrate, 12.5 g sodium cyanide and 13.75 g of sodium bicarbonate in 500 ml water. The electrodeposition is carried out at a current density of 3 mA/cm$^2$ and 12 min. time of deposition. Using the same cell and procedure silver is electrodeposited with the same current density and time of deposition on a massive silver electrode. Current potential curves for the reduction of oxygen from an oxygen-saturated 0.1 N KOH solution were measured on the electrodeposited-on pyrolytic graphite silver electrodes which were used in a rotating disc as previously described in Example 12. The same oxygen reduction experiments were performed on a massive silver electrode and on a silver electrodeposited on massive silver electrode. The results are shown in FIGS. 6–10. The plots show that electrodeposited-on pyrolytic graphite silver has a higher electrocatalytic activity for oxygen reduction than either a massive silver or electrodeposited-on massive silver surface.

EXAMPLE 17

Silver is electrodeposited on a pyrolytic graphite sample in the same manner described in Example 16. The prepared surface is first washed in distilled water and then immersed in an aqueous solution of dilute nitric acid for a few seconds. The electrode is then used as a rotating disc cathode in an electrochemical cell containing oxygen-saturated 0.1 N KOH solution. Current-potential curves for the reduction of oxygen were obtained in the same manner as described in Example 16. The same oxygen reduction study was performed on a massive silver electrode which was similarly pretreated in dilute nitric acid. The data of both experiments was used to plot FIG. 11 which shows the dependence of limiting current density on the square root of rotation rate (Levich plot). FIG. 11 shows that the catalytic activity of a massive silver electrode is drastically reduced by pretreatment with dilute nitric acid while that of an electrodeposited silver on pyrolytic graphite is only slightly influenced by the same treatment which is an indication that the two silver surfaces are very different in nature.

EXAMPLE 18

Silver is electrodeposited on pyrolytic graphite samples as described in Example 16. The electrode is used in an electrochemical cell containing He-saturated 0.1 N KOH solution. The potential of the electrode was potentiostatically scanned from 0 to $-1$ V (vs. Hg/HgO, 1.0 N KOH) and vice versa from $-1.0$ to 0 V. In another experiment the potential was scanned from 0.5 V to $-1.0$ V and vice versa from $-1.0$ to 0.5 V. The current corresponding to oxygen adsorption and its reduction as a function of the potential are recorded on an X-Y recorder. The plots are shown on FIG. 12. The corresponding plots obtained with a massive silver electrode are shown on FIG. 13. Notice that the geometrical surface area of the silver-on pyrolytic graphite electrode is 0.338 $cm^2$ and that of the massive silver electrode is 0.786 $cm^2$. A comparison between the current densities of both FIGS. 12 and 13 indicates that the silver-on pyrolytic graphite electrode has a considerably higher electrocatalytic activity towards oxygen adsorption from solutions as compared to a massive silver electrode. The silver on pyrolytic graphite electrode may therefore be used as cathode in some alkaline storage batteries.

EXAMPLE 19

Using a simple conventional electrochemical cell with two gold anodes placed symmetrically around a pyrolytic graphite cathode, gold is electrodeposited from a mechanically stirred solution which has the following chemical composition: 6.8 g $HAuCl_4 \cdot 3H_2O$, 222 g calcium chloride in 500 ml of water. The electrodeposition is carried out at a current density of 6 $mA/cm^2$ and the time of deposition is 20 minutes.

In other experiments gold was electrodeposited at higher current densities than 6 $mA/cm^2$ if during the pyrolytic graphite cathode is rotated (as a rotating disc electrode). Under such conditions gold was electrodeposited from the same solution described above at a current density of 30 $mA/cm^2$ and time of deposition of 2 minutes.

The electrocatalytic activity towards oxygen reduction of gold electrodes prepared as described above was studied in oxygen-saturated 0.1 N NaOH solution in the same manner as described in Example 16. The data shows that gold electrodeposited on pyrolytic graphite has higher electrocatalytic activity toward oxygen reduction than a massive gold electrode. The higher the current density used to electrodeposit the gold the higher is the electrocatalytic activity.

EXAMPLE 20

Using a simple conventional cell and two silver anodes placed symmetrically around a pyrolytic graphite cathode a silver nickel alloy is electrodeposited from a mechanically stirred solution which has the following composition: 6.9 g of silver cyanide, 1.1 g of nickel cyanide and 12 g of sodium cyanide in 100 ml of water. The electrodes so prepared were used to study oxygen reduction and were found to exhibit excellent electrocatalytic activity.

EXAMPLE 21

Using a simple conventional cell and two silver anodes symmetrically placed around a pyrolytic graphite cathode a silver-gold alloy was electrodeposited on the latter electrode from a mechanically stirred solution which has the following composition: 4.5 g of $KAu(CN)_2$, 10.0 g of potassium cyanide and 3.02 g of silver cyanide in 500 ml of water. The electrodeposition is carried out at a current density of 30 $mA/cm^2$ of time deposition of 5 sec. or a current density of 6 $mA/cm^2$ and time of deposition of 12 min. The electrodes thus prepared were found to have excellent electrocatalytic activity toward oxygen reduction. The observed increase in the electrocatalytic activity when the silver surface is prepared by electrodepositing Ag on either graphite or platinum most probably results from the effect of electrochemical three-dimensional nucleation (associated with the electrodeposition of silver from silver cyanide on a foreign substrate such as graphite or platinum) in increasing the electrocatalytically active area of the silver surface. Other alternative explanations would be that impurities left on bulk silver surface from polishing with an alumina powder has a poisoning effect on such active area or that the difference between the residual current due to reduction of silver oxides species in both cases results in the observed differences in limiting current.

The electrodeposition of silver from silver cyanide on either pyrolytic graphite or platinum is accompanied with a very high nucleation overpotential. In contrast the electrodeposition of silver on a silver substrate occurs without any such nucleation overpotential. The high nucleation overpotential in the case of graphite and platinum substrates results from the high energy barrier associated with nucleation. Silver cannot form mixed crystals with such foreign substrates and therefore can only condense on its surface and forms a granular or nodular deposit.

The higher electrocatalytic activity of silver electrodeposited on a pyrolytic graphite substrate is compared to that electrodeposited on a platinum substrate may be attributed to the formation of a higher number of nuclei/square centimeter in the former case. The higher number of nuclei is expected on the basis of the much higher nucleation time observed with the graphite substrate.

I claim:

1. A method of producing an electrochemical catalyst consisting of a thin film of a metal selected from the group consisting of Ni, noble metals, and alloys thereof, deposited onto a non-porous pyrolytic graphite support wherein the improvement comprises electrolytically depositing said thin film of metal onto said non-porous pyrolytic graphite support in a simple electrochemical cell from an aqueous solution containing said Ni, noble metals, or alloys thereof in a complex salt form.

2. A method as claimed in claim 1, characterized in that said noble metal is silver.

3. A method as claimed in claim 2, characterized in that the electrolytic deposit of silver onto said non-porous pyrolytic graphite support is effected from an aqueous solution containing silver cyanide.

4. A method as claimed in claim 3, characterized in that the electrolytic deposit of silver onto said non-porous pyrolytic graphite support is effected from an aqueous solution of silver nitrate, of sodium cyanide and of sodium bicarbonate under a current density of 1 to 12 mA for a time period ranging from 3 to 12 minutes.

5. A method as claimed in claim 2, characterized in that the electrolytically deposited silver film is electrochemically oxidize and therefafter reduced.

6. A method as claimed in claim 1, characterized in that said noble metal is palladium.

7. A method as claimed in claim 6, characterized in that the electrolytic deposit of palladium onto said non-porous pyrolytic graphite support is effected under stirring from an aqueous solution containing palladium chloride.

8. A method as claimed in claim 7, characterized in that the electrolytic deposit of palladium onto said non-porous pyrolytic graphite support is effected under stirring from an aqueous solution of palladium chloride, ammonium chloride and hydrochloric acid under a current density of about 5 to 150 mA/cm² for a time period ranging from 12 seconds to 35 minutes.

9. A method as claimed in claim 1, characterized in that said noble metal is gold.

10. A method as claimed in claim 9, characterized in that the electrolytic deposit of gold onto said non-porous pyrolytic graphite support is effected under stirring from an aqueous solution of $HAuCl_4 \cdot 3H_2O$ and calcium chloride under a current density of about 6 mA/cm² for a time period of about 20 minutes.

11. A method as claimed in claim 1, characterized in that said noble metal is platinum.

12. A method as claimed in claim 11, characterized in that the electrolytic deposit of platinum onto said non-porous pyrolytic graphite support is effected under stirring from an aqueous solution of $H_2PtCl_6$ and HCl under a current density of about 24 mA/cm² for a period of time of about 10 minutes.

13. A method as claimed in claim 1, characterized in that said alloy of metal is selected in the group consisting of the gold-silver alloys and the silver-nickel alloys.

14. A method as claimed in claim 11, characterized in that the electrolytic deposit of said silver-nickel alloys is effected from an aqueous solution of silver cyanide, of sodium cyanide and of nickel cyanide.

* * * * *